(12) United States Patent
Yang

(10) Patent No.: US 11,410,549 B2
(45) Date of Patent: Aug. 9, 2022

(54) METHOD, DEVICE, READABLE MEDIUM AND ELECTRONIC DEVICE FOR IDENTIFYING TRAFFIC LIGHT SIGNAL

(71) Applicant: BOE TECHNOLOGY GROUP CO., LTD., Beijing (CN)

(72) Inventor: Jinglin Yang, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 317 days.

(21) Appl. No.: 16/609,729

(22) PCT Filed: Jan. 22, 2019

(86) PCT No.: PCT/CN2019/072730
§ 371 (c)(1),
(2) Date: Oct. 30, 2019

(87) PCT Pub. No.: WO2019/227954
PCT Pub. Date: Dec. 5, 2019

(65) Prior Publication Data
US 2021/0158699 A1 May 27, 2021

(30) Foreign Application Priority Data
May 31, 2018 (CN) .......................... 201810554025.4

(51) Int. Cl.
*G08G 1/095* (2006.01)
*G06T 7/11* (2017.01)
(Continued)

(52) U.S. Cl.
CPC ........... *G08G 1/095* (2013.01); *G06K 9/6232* (2013.01); *G06K 9/6288* (2013.01);
(Continued)

(58) Field of Classification Search
CPC .... G08G 1/095; G08G 1/0116; G08G 1/0145; G06T 7/11; G06T 3/4007; G06T 3/4046;
(Continued)

(56) References Cited

U.S. PATENT DOCUMENTS

| 10,185,881 B2 | 1/2019 | Moosaei et al. |
| 2010/0121936 A1* | 5/2010 | Liu ..................... H04L 65/4092 709/217 |

(Continued)

FOREIGN PATENT DOCUMENTS

| CN | 106295605 A | 1/2017 |
| CN | 107038420 A | 8/2017 |

(Continued)

OTHER PUBLICATIONS

International Search Report and Written Opinion dated Apr. 26, 2019, from application No. PCT/CN2019/072730.
(Continued)

*Primary Examiner* — Qun Shen
(74) *Attorney, Agent, or Firm* — Arch & Lake LLP

(57) ABSTRACT

The present disclosure relates to a method, device, computer readable media, and electronic devices for identifying a traffic light signal from an image. The method for identifying a traffic light signal from an image includes extracting, based on a deep neural network, multiple layers of first feature maps corresponding to different layers of the deep neural network from the image. The method includes selecting at least two layers of the first feature maps having different scales from the multiple layers of the first feature maps. The method includes inputting the at least two layers of the first feature maps to a convolution layer having a convolution kernel matching a shape of a traffic light to
(Continued)

obtain a second feature map. The method includes obtaining a detection result of the traffic light signal based on the second feature map.

10 Claims, 5 Drawing Sheets

(51) Int. Cl.
*G06K 9/62* (2022.01)
*G06N 3/04* (2006.01)
*G06N 3/08* (2006.01)
*G06T 3/40* (2006.01)
*G08G 1/01* (2006.01)
*G06V 20/58* (2022.01)

(52) U.S. Cl.
CPC ............. *G06N 3/0454* (2013.01); *G06N 3/08* (2013.01); *G06T 3/4007* (2013.01); *G06T 3/4046* (2013.01); *G06T 7/11* (2017.01); *G06V 20/582* (2022.01); *G08G 1/0116* (2013.01); *G08G 1/0145* (2013.01)

(58) Field of Classification Search
CPC ............. G06K 9/00818; G06K 9/6232; G06K 9/6288; G06N 3/0454; G06N 3/08; G06V 20/582
See application file for complete search history.

(56) References Cited

U.S. PATENT DOCUMENTS

| | | | |
|---|---|---|---|
| 2014/0266823 A1* | 9/2014 | Biallais | H03M 1/0607 |
| | | | 341/118 |
| 2018/0003686 A1* | 1/2018 | Ozcan | G01N 33/0098 |
| 2018/0068198 A1* | 3/2018 | Sawides | G06K 9/6274 |
| 2018/0129906 A1* | 5/2018 | Habi | G06K 9/4628 |
| 2018/0137642 A1* | 5/2018 | Malisiewicz | G06K 9/00201 |
| 2018/0144203 A1 | 5/2018 | Moosaei et al. | |
| 2018/0260793 A1* | 9/2018 | Li | G06T 7/001 |
| 2018/0348343 A1* | 12/2018 | Achour | G01S 7/354 |
| 2019/0005340 A1 | 1/2019 | Moosaei et al. | |
| 2019/0035101 A1* | 1/2019 | Kwant | G06V 20/588 |
| 2019/0122059 A1* | 4/2019 | Zhou | G06T 7/20 |

FOREIGN PATENT DOCUMENTS

| | | |
|---|---|---|
| CN | 107610140 A | 1/2018 |
| CN | 108090411 A | 5/2018 |
| CN | 108830199 A | 11/2018 |
| GB | 2 559 005 A | 7/2018 |

OTHER PUBLICATIONS

BigCowPeking "Target measurement: YOLOv2 algorithm detailed explanation", https://blog.csdn.net/wfei101/article/details/79398563, Feb. 28, 2018.
Chinese Office Action dated Mar. 18, 2020, from application No. 201810554025.4.
International Search Report and Written Opinion dated Apr. 26, 2019, from application No. PCT/US2019/072730.
Invincible brave, "Faster RCNN study notes", https://www.cnblogs.com/wangyong/p/8513563.html, Mar. 6, 2018.
Ren, et al., "Faster R-CNN: Towards Real-Time Object Detection with Region Proposal Networks", https://arxiv.org/abs/1506.01497, Jan. 6, 2016.
Zhou, Jiajia, "Research on Palmprint Recognition Algorithm Based on DCT-based Multi-color Channel Fusion", http://www.cmfd.cnki.net/Journal/index.aspx?dbcode=cmfd, Feb. 15, 2010.
"Faster RCNN study notes", Brave invincible, Dated Mar. 6, 2018, https://www.https://www.cnblogs.com/wangyong/p/8513563.html, 14 pages.
"Target Detection: Detailed Explanation of YOLOv2 Algorithm", Dated Feb. 28, 2018, https://www.https://blog.csdn.net/wfei101/article/details/79398563, 20 pages.
Chinese Office Action dated Nov. 3, 2020, from application No. 201810554025.4.
Sebanja, Ian, "Automatic Detection and Recognition of Traffic Road Signs for Intelligent Autonomous Unmanned Vehicles for Urban Surveillance and Rescue", Dec. 3, 2010, IEEE, pp. 132-138.

* cited by examiner

METHOD, DEVICE, READABLE MEDIUM AND ELECTRONIC DEVICE FOR IDENTIFYING TRAFFIC LIGHT SIGNAL

CROSS-REFERENCE

The present application is based upon International Application No. PCT/CN2019/072730, filed on Jan. 22, 2019, which is based upon and claims the priority to the Chinese Patent Application No. 201810554025.4, entitled "Method, Device, Readable Medium, and Electronic Device for Identifying Traffic Light Signal", filed on May 31, 2018, the entire contents of which are hereby incorporated by reference.

TECHNICAL FIELD

The present application relates to the fields of computer and image processing, and in particular to a method, device, computer readable medium and electronic device for identifying a traffic light signal from an image.

BACKGROUND

With the development of science, in order to save and thus further liberate human resource, automatic driving and assisted driving technology have received more and more attention and development.

In the field of autonomous driving or assisted driving, a detection of traffic light signals is a basic and important function related to the safety of personnel. However, because the traffic light itself has the characteristics of small target and complex background, the detection of traffic lights has always been a difficult point in the industry.

SUMMARY

Arrangements of the present disclosure provide a method, device, computer readable medium, and electronic device for identifying a traffic light signal from an image.

According to an aspect of the present disclosure, there is provided a method for identifying a traffic light signal from an image. The method includes extracting, based on a deep neural network, multiple layers of first feature maps corresponding to different layers of the deep neural network from the image. The method includes selecting at least two layers of the first feature maps having different scales from the multiple layers of the first feature maps. The method includes inputting the at least two layers of the first feature maps to a convolution layer having a convolution kernel matching a shape of a traffic light to obtain a second feature map. The method includes obtaining a detection result of the traffic light signal based on the second feature map.

According to some arrangements, the deep neural network is a VGG network.

According to some arrangements, selecting at least two layers of the first feature maps having different scales from the multiple layers of the first feature maps includes selecting feature maps output from seventh, tenth, and thirteenth layers of the VGG network.

According to some arrangements, obtaining a detection result of the traffic light signal based on the second feature map includes: performing a pooling operation on the second feature map to obtain a fusion feature with uniform size; and obtaining the detection result from the fusion feature through a fully connected layer and an activation function layer.

According to some arrangements, the forgoing method further includes filtering the detection result with a positional confidence. The positional confidence indicates a probability that the traffic light appears in a lateral or longitudinal position in the image.

According to some arrangements, the forgoing method further includes extracting a first recommended region from an R channel of the image and a second recommended region from a G channel of the image. Obtaining a detection result of the traffic light signal based on the second feature map includes: fusing the second feature map, the first recommended region and the second recommended region to obtain a fusion feature; and obtaining the detection result of the traffic light signal based on the fusion feature.

According to some arrangements, fusing the second feature map, the first recommended region, and the second recommended region to obtain a fusion feature includes: performing a pooling operation on the second feature map to obtain a third feature map with a uniform size; mapping the first recommended region and the second recommended region to the third feature map with the uniform size to obtain a first mapping region and a second mapping region; and performing the pooling operation on the first mapping region and the second mapping region to obtain the fusion feature with the uniform size.

According to some arrangements, obtaining the detection result of the traffic light signal based on the fusion feature includes obtaining the detection result from the fusion feature through a fully connected layer and an activation function layer.

According to some arrangements, after extracting a first recommended region from an R channel of the image and extracting a second recommended region from a G channel of the image, the method further includes: determining positional confidences of the first recommended region and the second recommended region; and excluding the first recommended region and the second recommended region having the positional confidence less than a predetermined threshold.

According to some arrangements, extracting a first recommended region from an R channel of the image and a second recommended region from a G channel of the image includes extracting, by using an RPN network, the first recommended region and the second recommended region from any layer of the first feature map of the multiple layers of the first feature maps of the R channel and the G channel of the image respectively.

According to some arrangements, extracting a first recommended region from an R channel of the image and a second recommended region from a G channel of the image includes obtaining the first recommended region and the second recommended region from the R channel and the G channel respectively, via selective search or morphological filtering.

According to another aspect of the present disclosure, there is provided a method for identifying a traffic light signal from an image. The method includes extracting a feature map from the image based on a deep neural network; extracting a first recommended region from an R channel of the image and a second recommended region from a G channel of the image. The method incudes fusing the feature map, the first recommended region and the second recommended region to obtain a fusion feature. The method includes obtaining a detection result of the traffic light signal based on the fusion feature.

According to some arrangements, fusing the feature map, the first recommended region and the second recommended region to obtain a fusion feature includes: performing a pooling operation on the feature map to obtain a third feature map with a uniform size; mapping the first recommended region and the second recommended region to the third feature map with the uniform size to obtain a first mapping region and a second mapping region; and performing the pooling operation on the first mapping region and the second mapping region to obtain the fusion feature with the uniform size.

According to some arrangements, extracting a first recommended region from an R channel of the image and a second recommended region from a G channel of the image includes extracting the first recommended region of the R channel and the second recommended region of the G channel from a predetermined convolutional layer of the deep neural network, respectively, using an RPN network.

According to some arrangements, extracting a first recommended region from an R channel of the image and a second recommended region from a G channel of the image includes obtaining the first recommended region and the second recommended region from the R channel and the G channel respectively, via selective search or morphological filtering.

According to some arrangements, after extracting a first recommended region from an R channel of the image and a second recommended region from a G channel of the image, the method further includes: determining positional confidences of the first recommended region and the second recommended region; and excluding the first recommended region and the second recommended region having the positional confidence less than a predetermined threshold.

According to some arrangements, extracting a feature map from the image based on a deep neural network includes: extracting, based on the deep neural network, multiple layers of first feature maps corresponding to different layers of the deep neural network from the image; and selecting at least two layers of the first feature maps having different scales from the multiple layers of the first feature maps.

According to some arrangements, extracting a feature map from the image based on a deep neural network includes: extracting a first feature map from the image based on the deep neural network; and inputting the first feature map to a convolution layer having a convolution kernel matching a shape of a traffic light to obtain a second feature map.

According an aspect of the present disclosure, there is provided a device for identifying a traffic light signal from an image. The device includes a first feature extraction module. The first feature extraction module is configured to extract, based on a deep neural network, multiple layers of first feature maps corresponding to different layers of the deep neural network from the image. The device includes a second feature extraction module. The second feature extraction module is configured to select at least two layers of the first feature maps having different scales from the multiple layers of the first feature maps, and input the at least two layers of the first feature maps to a convolution layer having a convolution kernel matching a shape of a traffic light to obtain a second feature map. The device includes an output module, configured to obtain a detection result of the traffic light signal based on the second feature map.

According an aspect of the present disclosure, there is provided a device for identifying a traffic light signal from an image. The device includes a feature extraction module configured to extract a feature map from the image based on a deep neural network. The device includes a region extraction module configured to extract a first recommended region from an R channel of the image and a second recommended region from a G channel of the image. The device includes a fusion module configured to fuse the feature map, the first recommended region and the second recommended region to obtain a fusion feature. The device includes an output module configured to obtain a detection result of the traffic light signal based on the fusion feature.

According to yet another aspect of the present disclosure, there is provided a computer readable medium, having a computer program stored thereon. When the program is executed by a processor, any one of the above methods is implemented.

According to yet another aspect of the present disclosure, there is provided an electronic device, including: a processor; and a memory for storing executable instructions of the processor. The processor is configured to execute the executable instructions to implement any one of the above methods.

BRIEF DESCRIPTION OF THE DRAWINGS

The above and other features and advantages of the present disclosure will become more apparent from the detailed description of example arrangements.

DETAILED DESCRIPTION

Figure 1:
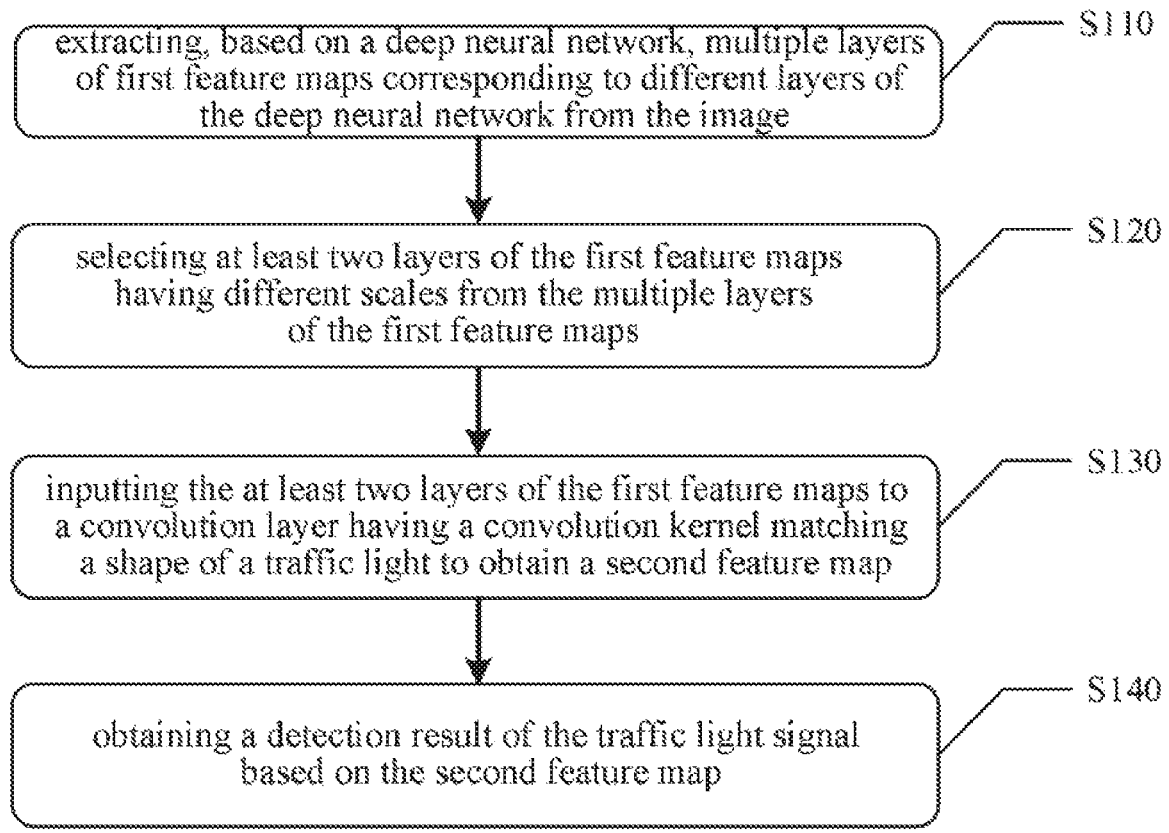
FIG. 1 illustrates a method for identifying a traffic light signal from an image, in accordance with an arrangement of the present disclosure.

Example arrangements will now be described more fully with reference to the accompanying drawings. However, the arrangements can be implemented in a variety of forms and should not be construed as being limited to the examples set forth herein; rather, these arrangements are provided so that this disclosure will be more complete so as to convey the idea of the example arrangements to those skilled in this art. The same reference numerals in the drawings denote the same or similar parts, and the repeated description thereof will be omitted.

In addition, the described features, structures, or characteristics may be combined in one or more arrangements in any suitable manner. In the following description, numerous specific details are set forth to provide a full understanding of the arrangements of the present disclosure. However, one skilled in the art will appreciate that the technical solution of the present disclosure can be practiced without one or more of the described specific details or by using other methods, components, materials, devices, operations, etc. In other instances, well-known structures, methods, devices, implementations, materials or operations are not shown or described in detail to avoid obscuring aspects of the present disclosure.

Some of the block diagrams shown in the figures do not necessarily correspond to physically separate entities. That is, these functional entities may be implemented in software, or implemented in one or more hardware modules or integrated circuits, or implemented in different networks and/or processor devices and/or microcontroller devices.

The flowcharts shown in the figures are merely illustrative and do not necessarily include all of the operations. For example, some operations may be decomposed, and some operations may be combined or partially fused, so the actual execution order may vary depending on the actual situation.

In the field of automatic driving or assisted driving, a detection of traffic lights is a basic function. However, because the traffic light itself has the characteristics of small target and complex background, the detection of traffic lights has always been a difficult point in the industry. The inventors have proposed a method based on a deep neural network, which combines deep learning and prior knowledge of the traffic light itself to detect the target.

The technical solution of the present application will be described in detail below with reference to the accompanying drawings.

FIG. 1 illustrates a method for identifying a traffic light signal from an image, in accordance with an arrangement of the present disclosure. The image may be obtained by a camera of an autonomous vehicle or a vehicle having an assisted driving function, but the technical solution of the present disclosure is not limited thereto. Additionally, the image may be a pre-processed image.

As shown in FIG. 1, at S110, multiple layers of first feature maps corresponding to different layers of a deep neural network are extracted from the image based on the deep neural network.

Traditional traffic light signal identification generally adopts artificially designed features such as color and shape as the main features of the detection algorithm. The form is relatively simple, and it is difficult to accurately detect the target. With the introduction of deep learning technology, the use of deep learning to identify traffic light signals has also received more and more attention.

Deep learning is a special kind of machine learning representing the world by using nested concept hierarchies and realizing great functionality and flexibility. Deep learning is essentially a deep neural network. The deep neural network with multiple hidden layers has excellent feature learning ability, and the learned features have more essential characters for data, which is beneficial to visualization or classification. The strength of the deep neural network is that its multi-layer structure can automatically learn features, and can learn multiple levels of features: a sensing domain of a shallower convolutional layer is smaller, thus learning some local region features; the sensing domain of a deeper convolutional layer is larger, thus learning more abstract features.

At present, a variety of deep neural network models have been proposed, and people continue to explore and propose other deep neural network models. According to some arrangements of the present disclosure, a VGG deep neural network model may be used, but the technical solution of the present disclosure is not limited thereto.

At S120, at least two layers of the first feature maps having different scales are selected from the multiple layers of the first feature maps.

For the problem that the traffic light is a small target, the inventor has added multi-scale information on the basis of the deep neural networks. The multi-scale detection is performed on different convolutional layers of the deep neural networks. As will be described, the arrangements of the present disclosure can fuse detection results of different scales to improve detection accuracy. For example, in an example arrangement employing a VGG network, feature maps output from seventh, tenth, and thirteenth layers of the VGG network are selected.

At S130, the at least two layers of the first feature maps are input to a convolution layer with a convolution kernel matching a shape of a traffic light to obtain a second feature map.

In order to further improve the detection accuracy, the arrangement of the present disclosure adds a convolution layer matching the shape of the traffic light after the deep neural network, which is more suitable for the shape of the traffic light, and improves the accuracy of the target detection. For example, for a common horizontal or vertical three-lamp form of traffic light, a convolution kernel of an irregular shape (e.g., a rectangular shape) such as 2*4/4*2, 2*5/5*2, 1*3/3*1, 2*6/6*2 can be used.

Thus, for difficulties that a target region for a traffic light is small, the length and width in the image often only range from a few to tens of pixels and the background is messy (buildings, trees, and sky can all appear as backgrounds, especially car lights, street lights, etc., which are similar in color to traffic lights and greatly interfere with the detection of traffic lights), according to an arrangement of the present disclosure, the target detection accuracy is significantly improved by combining multi-scale detection and rectangular convolution kernels matching the shape of traffic lights better.

At S140, a detection result of the traffic light signal is obtained based on the second feature map. According to some arrangements, firstly, a pooling operation is performed on the second feature map to obtain a fusion feature with a uniform size; and then the detection result is obtained from the fusion feature through a fully connected layer and an activation function layer.

The deep neural network extracts features from the input image through the convolution and pooling layers, while the fully connected layer acts as a classifier. The fully connected layer is a traditional multilayer perceptron, and the softmax activation function (or other classifier such as SVM) may be used at the output layer. The sum of the output probabilities obtained from the fully connected layer is 1. The softmax function enters a vector with any value greater than 0 and converts them to a value vector between zero and one, the sum of which is one.

After the fully connected layer, the output layer outputs the final identifying results, including the traffic light category (red and green) and the bounding box.

According to some arrangements, the detection results may also be filtered using positional confidence. The positional confidence represents the probability that a traffic light will appear in a lateral or longitudinal position in the image.

Here, the lateral position refers to the abscissa of the target center point, and the longitudinal position refers to the ordinate of the target center point. The inventors have recognized that in a vehicle traveling image taken by a camera, there is a high possibility that the traffic light is located in the upper half and/or the right half of the image (right traffic rule). In this way, the confidence level of the image can be divided according to the center point ordinate/abscissa of the target, and the confidence gradually decreases from top to bottom and/or from right to left. Especially, according to the imaging situation taken by the camera, it is almost impossible that the traffic light appears in the lower half or the left half of the image, thus the confidence can be set to be close to zero. The inventors have therefore conceived of filtering the detection results using positional confidence. For example, based on the statistical results of big data, the probability that a traffic light appears in a certain location range can be obtained as a confidence. When the confidence of the detection result is lower than the threshold (for example, 0.5), the detection result may be excluded. In this way, the ability to suppress false alarms is improved.

When determining the detection result, the double threshold determining of the detection score and the position confidence is used. It is determined to be the target if and only if both scores are high. When a single score is high, the target is determined as a false, and then removed.

When the position confidence determination is performed before the fully connected layer, the detection speed may be further improved since the processing of the excluding may be omitted.

The image processed using the deep neural network is a color image, and the color image has three channels such as RGB. At this time, convolution and pooling are performed separately for each channel. Sometimes, for a specific purpose, it is also possible to combine several images into a set for one-time input processing.

According to some arrangements, the red channel and the green channel of the image are separately extracted and processed for the characteristics that the traffic light is red and green. In addition, the extraction result is fused with the multi-scale detection result of the deep neural network to obtain the detection result. For example, the first recommended region is extracted from the R channel of the image and the second recommended region is extracted from the G channel of the image. Here, the recommended region is the region where traffic lights may appear.

In the case of separately extracting the red channel and the green channel of the image for processing, according to some arrangements, the second feature map, the first recommended region and the second recommended region are fused to obtain a fusion feature, and then the detection result of the traffic light signal is obtained based on the fusion feature. For example, firstly, the pooling operation is performed on the second feature map to obtain a third feature map with the uniform size, and then the first recommended region and the second recommended region are mapped to the third feature map with the uniform size to obtain the first mapping region and the second mapping region; then the pooling operation is performed on the first mapping region and the second mapping region to obtain the fusion feature with the uniform size. The fusion feature is input to the fully connected layer and the output of the fully connected layer is further provided to the activation function layer.

According to some arrangements, after the recommended region is obtained, the positional confidence of the first recommended region and the second recommended region may be determined, and then the first recommended region and the second recommended region whose positional confidence is less than a predetermined threshold are excluded.

According to some arrangements, the first recommended region and the second recommended region are extracted using an RPN network from any layer of the first feature map of the multiple layers of the first feature maps of the R channel and the G channel of the image respectively.

Figure 2:
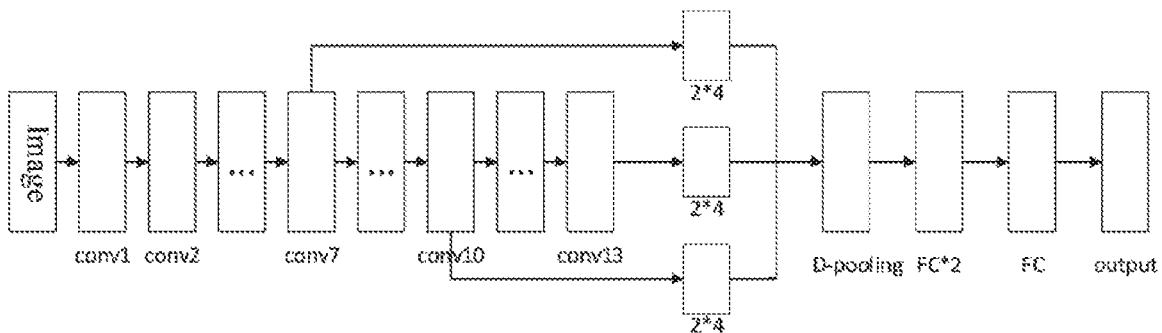
FIG. 2 illustrates a network model for identifying a traffic light signal from an image, in accordance with an example arrangement of the present disclosure.

FIG. 2 illustrates a network model for identifying a traffic light signal from an image, in accordance with an example arrangement of the present disclosure. The network model employs a VGG-16 deep neural network, but the technical solution of the present disclosure is not limited thereto.

The VGG is a widely used model that has been proven to have better feature extraction performance. The VGG deepens the number of network layers and avoids too many parameters at the same time. All layers adopt 3×3 small convolution kernels, and the convolution layer is set to 1. The input of VGG is set to RGB image of 224×244 size, the RGB mean is calculated for all images on the training set image, and then the image is transmitted as input to the VGG convolution network. A 3×3 or 1×1 filter is used, and the convolution layer is fixed to 1. The fully connected layer of VGG is three. According to the total number of the convolution layers adding the fully connected layers, the VGG can vary from VGG11 to VGG19. The minimum VGG11 has 8 convolution layers and 3 fully connected layers, and the most VGG19 has 16 convolution layers and 3 fully connected layers. In addition, not each convolutional layer follows a pooling layer in the VGG network. Five pooling layers are distributed under different convolutional layers.

Referring to FIG. 2, according to an example arrangement, the configuration of the VGG-16 includes 13 convolution layers and 3 fully connected layers (conv1, conv2, . . . , conv7, . . . , conv10, . . . , conv13, FC), a total of 16 layers of network. The convolution kernel has a length and width of 3*3. The deeps are 64, 128, 256, and 512, respectively. The present disclosure uses the first 13 layers of convolutional layers as a tool for feature extraction.

Referring to FIG. 2, after the seventh, ten, and 13th layers of convolutional layer processing, the output of the three layers is input into a convolution layer with a convolution kernel having a size of, for example, 2*4*512 (for a traffic light in the form of a vertical three-lamp). According to the technical idea of the present disclosure, the convolution layer with the convolution kernel matching the shape of the traffic light is added to be more suitable for the shape of the traffic light, and the accuracy of the target detection is improved. For common horizontal or vertical three-lamp traffic lights, a convolution kernel of a regular shape (for example, a rectangular shape) such as 2*4/4*2, 2*5/5*2, 1*3/3*1, 2*6/6*2, etc., may be used, but the solution of the present disclosure is not limited thereto.

Referring to FIG. 2, in the pooling layer D-pooling, the pooling operation is performed on the previously obtained feature map to obtain a fusion feature with the uniform size. And then the detection result is obtained from the fusion feature through the fully connected layer FC and the activation function layer.

Figure 3:
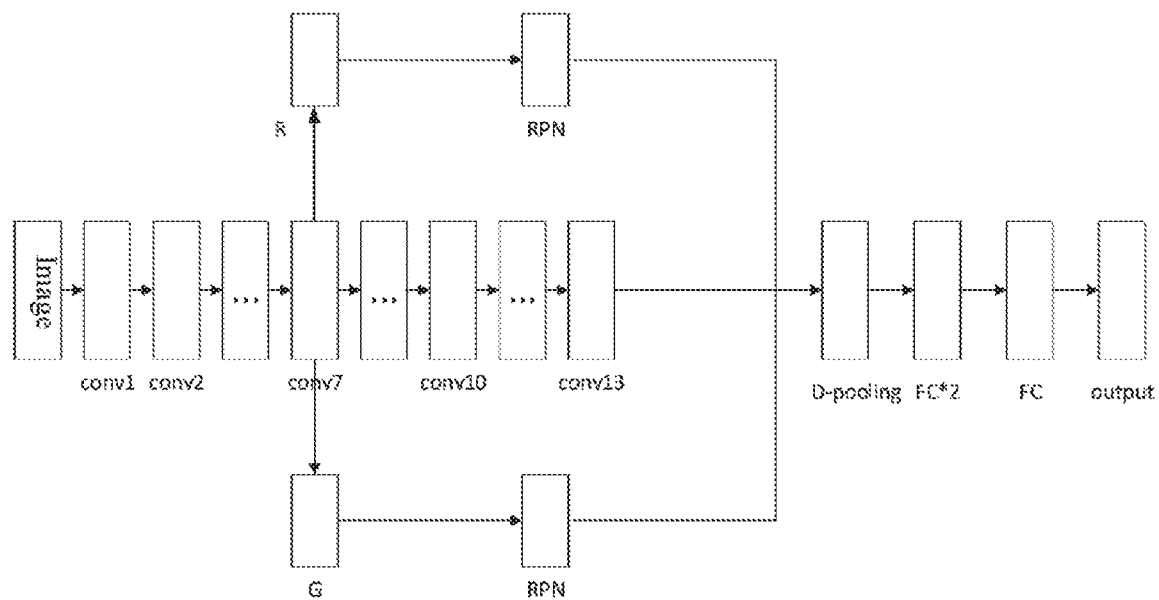
FIG. 3 illustrates a network model for identifying a traffic light signal from an image, in accordance with an example arrangement of the present disclosure.

FIG. 3 illustrates a network model for identifying a traffic light signal from an image, in accordance with an example arrangement of the present disclosure. The network model employs a VGG-16 deep neural network, but the technical solution of the present disclosure is not limited thereto.

In the arrangement shown in FIG. 3, for the characteristics that the traffic light is red and green, in addition to using VGG-16 as the main network to process all three R/G/B channels, the red R channel and the green G channel of the image are separately extracted and processed. The region where the traffic light may appear (recommended region) is extracted using, for example, an RPN (Region Proposal Network). Then, the extraction result is fused with the detection result of the main network to obtain a detection result.

As shown in FIG. 3, the recommended region is generated using the feature map of the VGG-16 convolution layer through the RPN. The figure shows that the recommended region is generated using the convolutional layer conv7 as a shared convolutional layer, but the solution of the present disclosure is not limited thereto. The main idea of RPN is to use the output of the convolutional layer to directly generate the recommended region. The method used is essentially a sliding window.

The present disclosure is not limited to generating a recommended region by RPN. For example, the recommended region may also be obtained from the R channel and the G channel by selective search or morphological filtering, respectively. According to some arrangements, about 2000 recommended regions (candidate boxes) may be extracted from the image using a selective search algorithm. According to other arrangements, a morphological filtering method may be employed to obtain a recommended region using filter conditions such as a color candidate region, an aspect ratio, a circle having a predetermined radius range, and the like.

Figure 4:
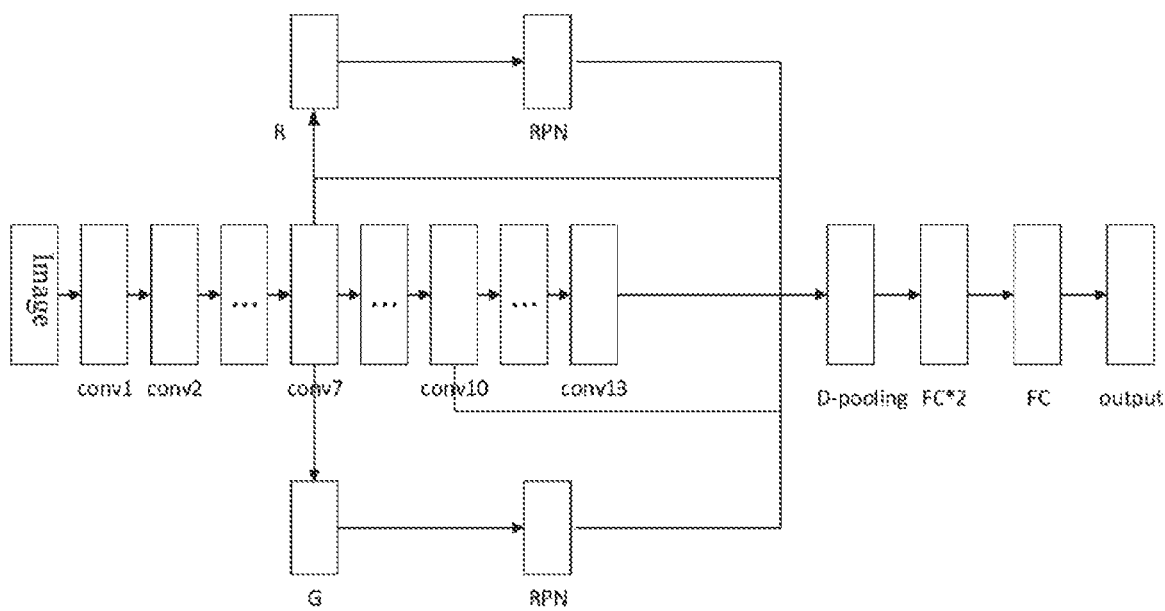
FIG. 4 illustrates a network model for identifying a traffic light signal from an image, in accordance with an example arrangement of the present disclosure.

FIG. 4 illustrates a network model for identifying a traffic light signal from an image, in accordance with an example arrangement of the present disclosure. The network model employs a VGG-16 deep neural network, but the technical solution of the present disclosure is not limited thereto.

Referring to FIG. 4, based on the arrangement shown in FIG. 3, the solution shown in FIG. 4 further incorporates a multi-scale detection function. Please refer to the previous description in conjunction with FIG. 2, and details are not described herein again.

Figure 5:
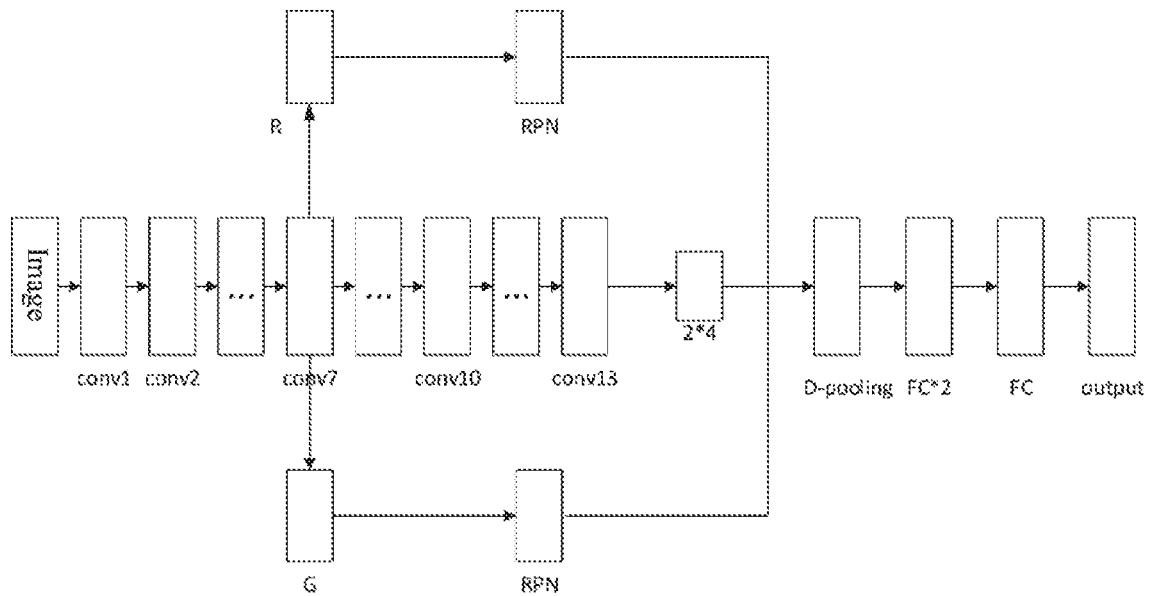
FIG. 5 illustrates a network model for identifying a traffic light signal from an image in accordance with an example arrangement of the present disclosure.

FIG. 5 illustrates a network model for identifying a traffic light signal from an image, in accordance with an example arrangement of the present disclosure. The network model employs a VGG-16 deep neural network, but the technical solution of the present disclosure is not limited thereto.

Referring to FIG. 5, on the basis of the arrangement shown in FIG. 3, the solution shown in FIG. 5 further incorporates a convolution layer having the convolution kernel matching the shape of the traffic light. Please refer to the previous description in conjunction with FIG. 2, and details are not described herein again.

Figure 6:
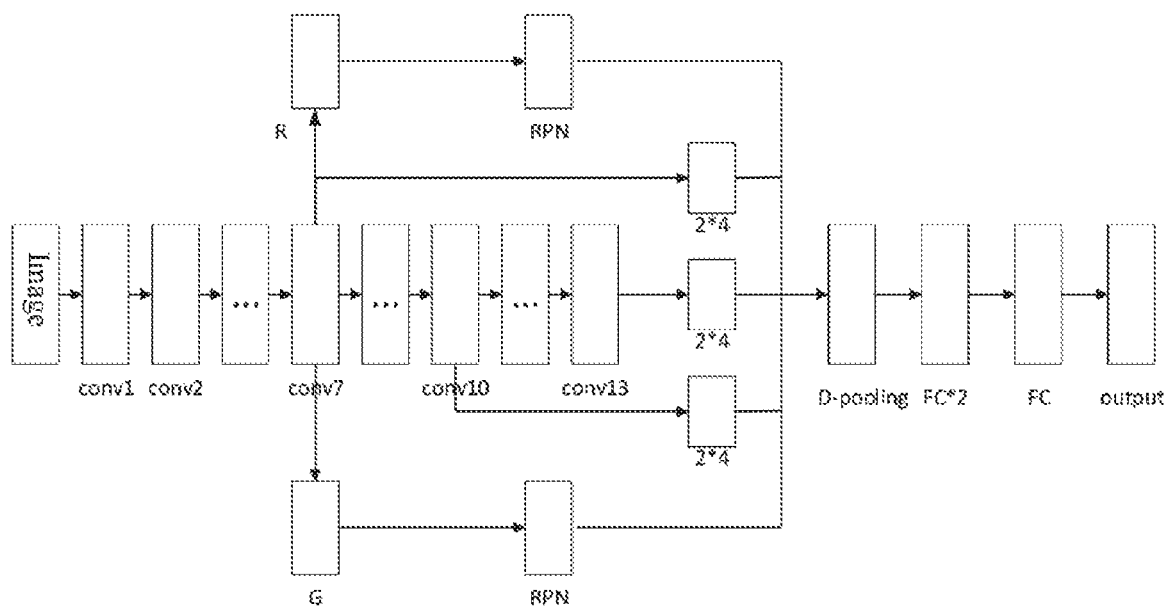
FIG. 6 illustrates a network model for identifying a traffic light signal from an image, in accordance with an example arrangement of the present disclosure.

FIG. 6 illustrates a network model for identifying a traffic light signal from an image, in accordance with an example arrangement of the present disclosure. The network model employs a VGG-16 deep neural network, but the technical solution of the present disclosure is not limited thereto.

Referring to FIG. 6, the solution shown in FIG. 6 incorporates the solutions shown FIG. 2 and FIG. 3. Referring to the foregoing description with reference to FIG. 2 and FIG. 3, and details are not described herein again.

According to an example arrangement of the present disclosure, the network model is trained using self-collected camera data. Each image is marked with the type (red light, green light) and position (the coordinates and length and width of the upper left corner of the bounding box) of the traffic light. Using a general backpropagation method, the loss function is determined by both the position and the threshold. The batch size is 32 and the learning rate is 0.001.

Figure 7:
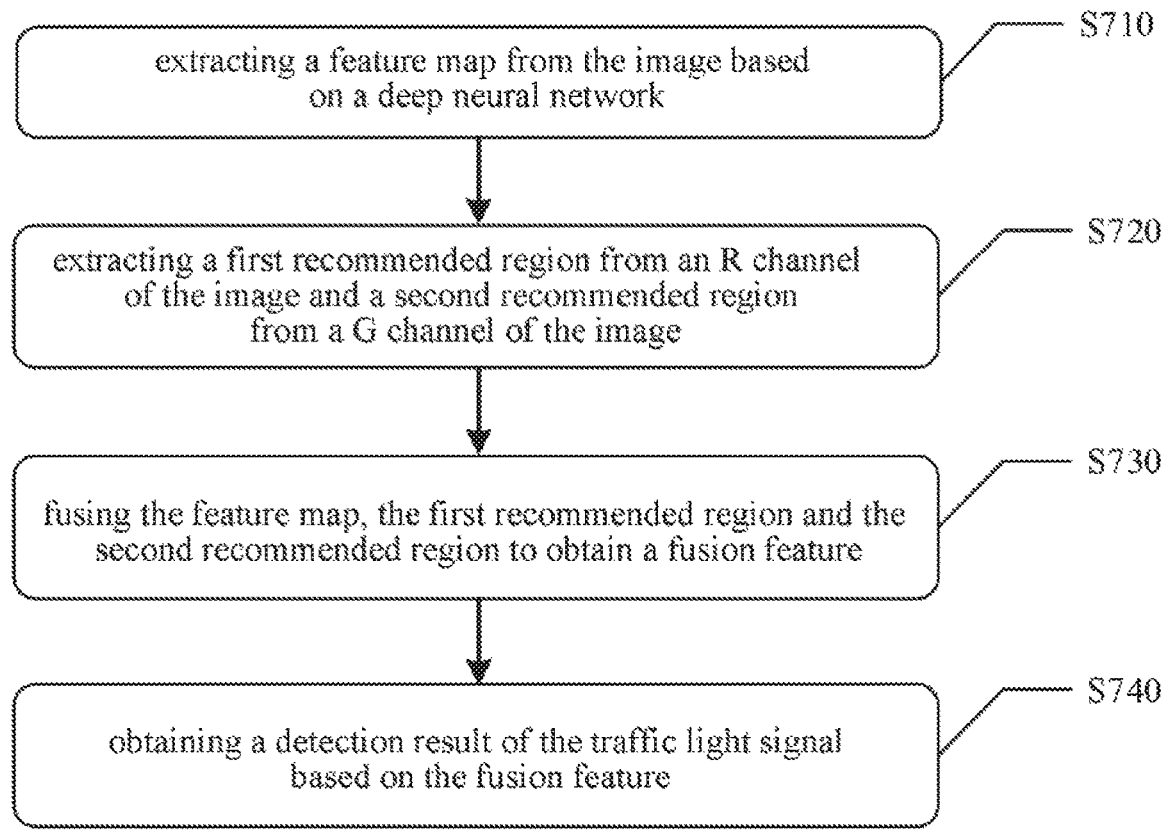
FIG. 7 illustrates a method for identifying a traffic light signal from an image in accordance with another arrangement of the present disclosure.

FIG. 7 illustrates a method for identifying a traffic light signal from an image in accordance with another arrangement of the present disclosure. The image may be obtained by a camera of an autonomous vehicle or a vehicle having an assisted driving function, but the technical solution of the present disclosure is not limited thereto. Additionally, the image may be a pre-processed image.

As shown in FIG. 7, at S710, a feature map is extracted from an image based on a deep neural network. As before, according to some arrangements of the present disclosure, a VGG deep neural network model may be used, but the technical solution of the present disclosure is not limited thereto.

As before, according to some arrangements, multi-scale detection is employed simultaneously. For example, multiple layers of first feature maps corresponding to different layers of the deep neural network is extracted from the image based on the deep neural network, then at least two layers of the first feature maps having different scales are selected from the multiple layers of the first feature maps.

According to other arrangements, the convolution layer with the convolution kernel matching the traffic light shape is used at the same time, which improves the accuracy of the target detection. For example, the first feature map is extracted from the image based on the deep neural network, and then the first feature map is input to the convolution layer with the convolution kernel matching the traffic light shape to obtain a second feature map for target detection.

At S720, a first recommended region is extracted from an R channel of the image and a second recommended region is extracted from a G channel of the image.

As before, the image processed using the deep neural network is a color image, and the color image has three channels such as RGB. At this time, convolution and pooling are performed separately for each channel. Sometimes, for a specific purpose, it is also possible to combine several images into a set for one-time input processing.

As before, according to an example arrangement, the red channel and the green channel of the image are separately extracted and processed for the characteristics that the traffic light is red and green. In addition, the extraction result is fused with the detection result of the deep neural network to obtain the detection result. For example, the first recommended region is extracted from the R channel of the image and the second recommended region is extracted from the G channel of the image. Here, the recommended region is the region where traffic lights may appear.

In the case of separately extracting the red channel and the green channel of the image for processing, according to some arrangements, the second feature map, the first recommended region and the second recommended region are fused to obtain a fusion feature, and then the detection result of the traffic light signal is obtained based on the fusion feature. For example, firstly, the pooling operation is performed on the second feature map to obtain a third feature map with the uniform size, and then the first recommended region and the second recommended region are mapped to the third feature map with the uniform size to obtain the first mapping region and the second mapping region; then the pooling operation is performed on the first mapping region and the second mapping region to obtain the fusion feature with the uniform size. The fusion feature is input to the fully connected layer and the output of the fully connected layer is further provided to the activation function layer.

According to some arrangements, after the recommended region is obtained, the positional confidence of the first recommended region and the second recommended region may be determined, and then the first recommended region and the second recommended region whose positional confidence is less than a predetermined threshold are excluded.

According to some arrangements, the first recommended region and the second recommended region are extracted using an RPN network from any layer of the first feature map of the multiple layers of the first feature maps of the R channel and the G channel of the image respectively, but the technical solution of the present disclosure is not limited thereto. For example, the first recommended region and the second recommended region may also be obtained from the R channel and the G channel, respectively, by selective search or morphological filtering.

At S730, the feature map, the first recommended region, and the second recommended region are fused to obtain a fused feature.

According to an example arrangement, first, the pooling operation is performed on the feature map to obtain a third feature map with the uniform size, and then the first recommended region and the second recommended region are mapped to the third feature map with the uniform size to obtain the first mapping region and the second mapping region; then the pooling operation is performed on the first mapping region and the second mapping region to obtain the fusion feature with the uniform size.

At S740, a detection result of the traffic light signal is obtained based on the fusion feature. As before, the detection results are obtained from the fusion features through the fully connected layer and the activation function layer.

Figure 8:
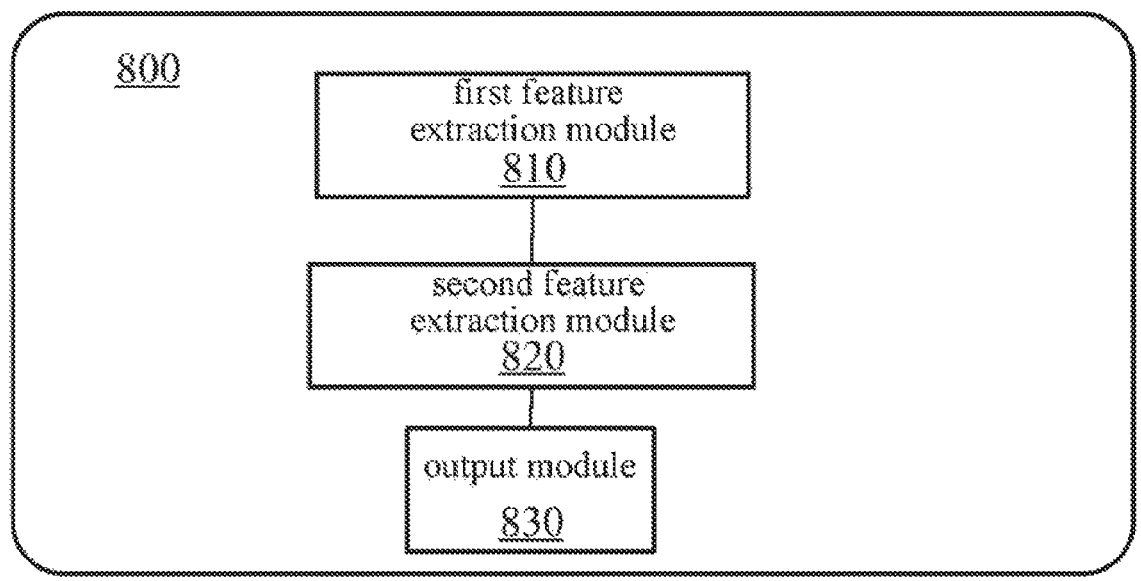
FIG. 8 illustrates a device for identifying a traffic light signal from an image, in accordance with an arrangement of the present disclosure.

FIG. 8 illustrates a device 800 for identifying a traffic light signal from an image, in accordance with an arrangement of the present disclosure. The image may be obtained by a camera of an autonomous vehicle or a vehicle having an assisted driving function, but the technical solution of the present disclosure is not limited thereto. Additionally, the image may be a pre-processed image.

As shown in FIG. 8, the device 800 includes a first feature extraction module 810, a second feature extraction module 820, and an output module 830.

The first feature extraction module 810 is configured to extract multiple layers of first feature maps corresponding to different layers of a deep neural network from the image based on the deep neural network.

As before, the first feature extraction module 810 may be configured to use the VGG deep neural network model, but the technical solution of the present disclosure is not limited thereto.

The second feature extraction module 820 is configured to select at least two layers of the first feature maps having different scales from the multiple layers of the first feature maps and input the at least two layers of the first feature maps to a convolution layer with a convolution kernel matching a shape of a traffic light to obtain a second feature map.

As before, for the problem that the traffic light is a small target, the inventor has added multi-scale information on the basis of deep neural networks. The multi-scale detection is performed on different convolutional layers of deep neural networks. The arrangements of the present disclosure may fuse detection results of different scales to improve detection accuracy. For example, the second feature extraction module 820 may be configured to employ a VGG network and select feature maps output from seventh, tenth, and thirteenth layers of the VGG network.

In addition, the second feature extraction module 820 may be configured to add a convolution layer matching the shape of the traffic light after the deep neural network, which is more suitable for the shape of the traffic light, and improves the accuracy of the target detection. For example, for a common horizontal or vertical three-lamp form of traffic light, a convolution kernel of an irregular shape (e.g., a rectangular shape) such as 2*4/4*2, 2*5/5*2, 1*3/3*1, 2*6/6*2 may be used.

The output module 830 is configured to obtain a detection result of the traffic light signal based on the second feature map.

As before, according to an example arrangement, the output module 830 is configured to perform a pooling operation on the second feature map to obtain the fusion feature with the uniform size, and then obtain a detection result from the fusion feature through the fully connected layer and the activation function layer.

Figure 9:
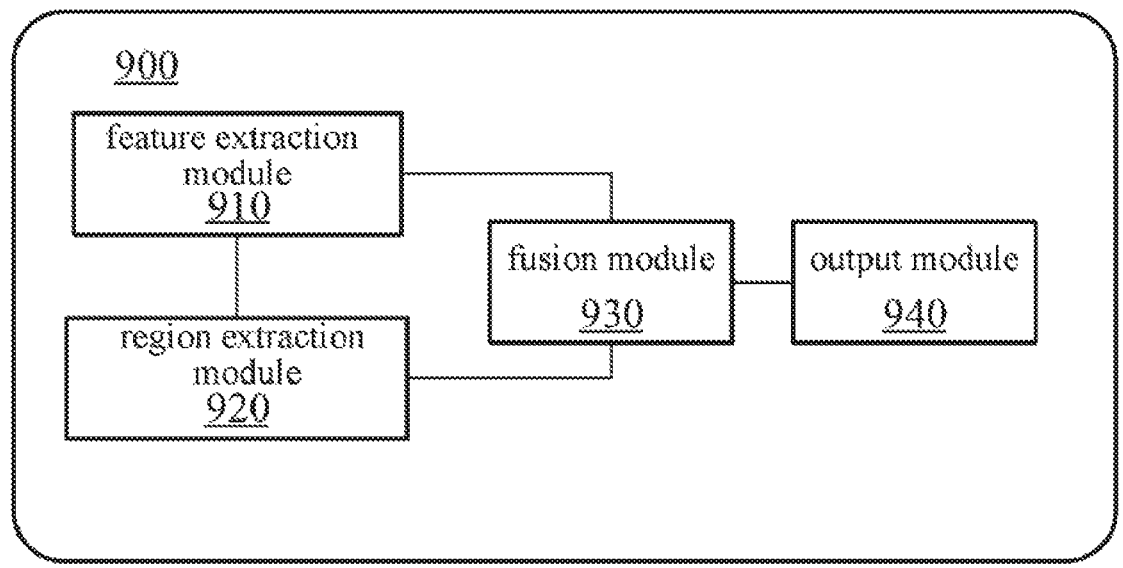
FIG. 9 illustrates a device for identifying a traffic light signal from an image, in accordance with an arrangement of the present disclosure.

FIG. 9 illustrates a device 900 for identifying a traffic light signal from an image, in accordance with an arrangement of the present disclosure. The image may be obtained by a camera of an autonomous vehicle or a vehicle having an assisted driving function, but the technical solution of the present disclosure is not limited thereto. Additionally, the image may be a pre-processed image.

As shown in FIG. 9, the device 900 includes a feature extraction module 910, a region extraction module 920, a fusion module 925, and an output module 930.

Referring to the foregoing discussion of methods, the feature extraction module 910 is configured to extract a feature map from the image based on a deep neural network. The region extraction module 920 is configured to extract a first recommended region from an R channel of the image and a second recommended region from a G channel of the image. The fusion module 925 is configured to fuse the feature map, the first recommended region and the second recommended region to obtain a fusion feature. The output module 930 is configured to obtain a detection result of the traffic light signal based on the fusion feature.

Figure 10:
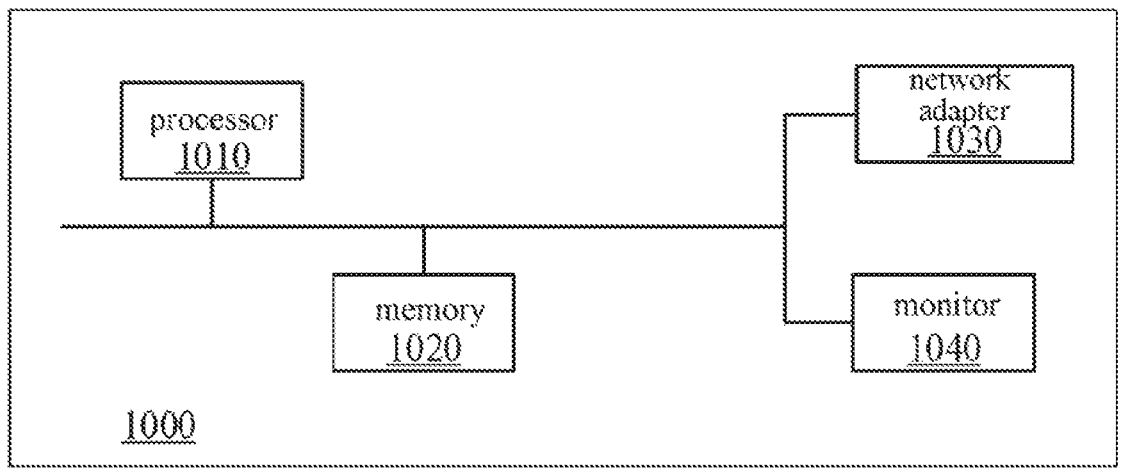
FIG. 10 shows an electronic device according to an arrangement of the present disclosure.

FIG. 10 illustrates an electronic device in accordance with an arrangement of the present disclosure, such as a general purpose or special purpose computing device, for performing the aforementioned method in accordance with the arrangement of the present disclosure.

As shown in FIG. 10, a server device 1000 may include a processor 1010, a memory 1020, a network adapter 1030, and a monitor 1040.

The memory 1020 may store instructions for the processor 1010 to control operational processing. The memory 1020 may include volatile or non-volatile memory such as static random access memory (SRAM), electrically erasable programmable read only memory (EEPROM), erasable programmable read only memory (EPROM), programmable read only memory (PROM), read only memory (ROM), etc., and the disclosure is not limited thereto.

The processor 1010 can invoke instructions stored in the memory 1020 to control related operations. According to an arrangement, the memory 1020 stores instructions for the processor 1010 to control the implementation of the aforementioned method. It is easy to understand that the memory 1020 may also store instructions for the processor 1010 to control other operations in accordance with arrangements of the present disclosure, and details are not described herein.

From the above detailed description, those skilled in the art will readily appreciate that systems and methods in accordance with arrangements of the present disclosure have one or more of the following advantages.

According to some arrangements of the present disclosure, for the problem that the traffic light is a small target, the multi-scale information is added on the basis of deep neural networks. The multi-scale detection is performed on different convolutional layers of deep neural networks. The detection results of different scales are fused to improve detection accuracy.

According to some arrangements of the present disclosure, a layer of convolution layer matching the shape of the traffic light is added after the deep neural network, which is more suitable for the shape of the traffic light, and thus the accuracy of the target detection is improved.

According to some arrangements of the present disclosure, the accuracy of target detection is significantly improved by combining multi-scale detection and rectangular convolution kernels that more closely conform to the shape of the traffic light.

According to some arrangements of the present disclosure, the detection result may be excluded when the positional confidence is below a threshold (e.g., 0.5). In this way, the ability to suppress false alarms is improved.

According to some arrangements, when the position confidence determination is performed before the fully connected layer, the detection speed may be further improved since the processing of the excluding may be omitted.

According to some arrangements, the red channel and the green channel of the image are separately extracted and processed for the characteristics that the traffic light is red and green. In addition, the extraction result is fused with the multi-scale detection result of the deep neural network to obtain the detection result, thus improving the detection accuracy.

Through the description of the above arrangements, those skilled in the art will readily understand that the example arrangements described herein may be implemented by software or by a combination of software with necessary hardware. Therefore, the technical solutions according to arrangements of the present disclosure may be embodied in the form of a software product, which may be stored in a non-volatile storage medium (which may be a CD-ROM, a USB flash drive, a mobile hard disk, etc.). A number of instructions are included to cause a computing device (which may be a personal computer, server, mobile terminal, or smart device, etc.) to perform the methods in accordance with the arrangements of the present disclosure.

It will be understood by those skilled in the art that the drawings are only a schematic diagram of the example arrangements, and the modules or processes in the drawings are not necessarily required to implement the disclosure, and therefore are not intended to limit the scope of the present disclosure.

Those skilled in the art can understand that each module exemplarily given in the specification can be distributed in the device according to the description of the arrangement, or can be correspondingly changed to be located in one or more devices different from the arrangement. The modules of the above arrangements may be combined into one module, or may be further split into multiple sub-modules.

The example arrangements of the present disclosure have been particularly shown and described above. It is to be understood that the present disclosure is not limited to the disclosed arrangements. Rather, the present disclosure intends to cover various modifications and equivalent arrangements, which are within the spirit and scope of the appended claims.

What is claimed is:

1. A method for identifying an object from an image, comprising:

extracting, based on a deep neural network, multiple layers of first feature maps corresponding to different layers of the deep neural network from the image;

selecting at least two layers of the first feature maps having different scales from the multiple layers of the first feature maps; inputting the at least two layers of the first feature maps to a convolution layer having a convolution kernel matching a shape of the object to obtain a second feature map; and obtaining a detection result of the object based on the second feature map, wherein the object is a traffic light, and wherein the deep neural network is a VGG network, and selecting at least two layers of the first feature maps having different scales from the multiple layers of the first feature maps comprises: selecting feature maps output from seventh, tenth, and thirteenth layers of the VGG network for improving accuracy of matching the shape of the traffic light.

2. The method according to claim 1, wherein obtaining a detection result of the object based on the second feature map comprises:

performing a pooling operation on the second feature map to obtain a fusion feature with uniform size; and obtaining the detection result of a traffic light signal from the fusion feature through a fully connected layer and an activation function layer.

3. The method according to claim 1, further comprising: filtering the detection result with a positional confidence, wherein the positional confidence indicates a probability that the traffic light appears in a lateral or longitudinal position in the image.

4. The method according to claim 1, further comprising:

extracting a first recommended region from an R channel of the image and a second recommended region from a G channel of the image, wherein the obtaining a detection result of the object based on the second feature map comprises:

fusing the second feature map, the first recommended region and the second recommended region to obtain a fusion feature; and obtaining the detection result of a traffic light signal based on the fusion feature.

5. The method according to claim 4, wherein fusing the second feature map, the first recommended region, and the second recommended region to obtain a fusion feature comprises:

performing a pooling operation on the second feature map to obtain a third feature map with a uniform size;

mapping the first recommended region and the second recommended region to the third feature map with the uniform size to obtain a first mapping region and a second mapping region; and performing the pooling operation on the first mapping region and the second mapping region to obtain the fusion feature with the uniform size.

6. The method according to claim 4, wherein obtaining the detection result of the object based on the fusion feature comprises:

obtaining the detection result of the traffic light signal from the fusion feature through a fully connected layer and an activation function layer.

7. The method according to claim 4, wherein after extracting a first recommended region from an R channel of the image and extracting a second recommended region from a G channel of the image, the method further comprises:

determining positional confidences of the first recommended region and the second recommended region; and excluding the first recommended region and the second recommended region having the positional confidence less than a predetermined threshold.

8. The method according to claim 4, wherein extracting a first recommended region from an R channel of the image and a second recommended region from a G channel of the image comprises:

extracting, by using an RPN network, the first recommended region and the second recommended region from any layer of the first feature map of the multiple layers of the first feature maps of the R channel and the G channel of the image respectively.

9. The method according to claim 4, wherein extracting a first recommended region from an R channel of the image and a second recommended region from a G channel of the image comprises:

obtaining the first recommended region and the second recommended region from the R channel and the G channel respectively, via selective search or morphological filtering.

10. A non-transitory computer readable medium, having a computer program stored thereon, wherein the computer program comprises executable instructions, and when the executable instructions are executed by a processor, a method comprising: extracting, based on a deep neural network, multiple layers of first feature maps corresponding to different layers of the deep neural network from the image; selecting at least two layers of the first feature maps having different scales from the multiple layers of the first feature maps; inputting the at least two layers of the first feature maps to a convolution layer having a convolution kernel matching a shape of a traffic light to obtain a second feature map; and obtaining a detection result of the traffic light signal based on the second feature map, wherein the object is a traffic light, and wherein the deep neural network is a VGG network, and selecting at least two layers of the first feature maps having different scales from the multiple layers of the first feature maps comprises: selecting feature maps output from seventh, tenth, and thirteenth layers of the VGG network for improving accuracy of matching the shape of the traffic light.

* * * * *